(12) United States Patent
College

(10) Patent No.: US 8,388,926 B2
(45) Date of Patent: Mar. 5, 2013

(54) SYSTEM AND METHOD FOR THE PRODUCTION OF GYPSUM USING HEAT RECOVERY

(75) Inventor: John W. College, Pittsburgh, PA (US)

(73) Assignee: CertainTeed Gypsum, Inc., Tampa, FL (US)

( * ) Notice: Subject to any disclaimer, the term of this patent is extended or adjusted under 35 U.S.C. 154(b) by 86 days.

(21) Appl. No.: 13/153,981

(22) Filed: Jun. 6, 2011

(65) Prior Publication Data

US 2011/0300032 A1 Dec. 8, 2011

Related U.S. Application Data

(63) Continuation of application No. 12/395,724, filed on Mar. 2, 2009, now Pat. No. 7,955,587, which is a continuation of application No. 11/653,073, filed on Jan. 12, 2007, now Pat. No. 7,498,014.

(60) Provisional application No. 60/758,790, filed on Jan. 13, 2006.

(51) Int. Cl.
*B01J 19/00* (2006.01)
*B32B 13/00* (2006.01)
*C01F 11/46* (2006.01)
*C04B 11/02* (2006.01)
*C04B 11/028* (2006.01)

(52) U.S. Cl. ........ 423/555; 422/129; 422/160; 422/162; 422/187; 156/39; 156/346; 52/443; 106/772; 106/783

(58) Field of Classification Search .................. 423/555; 422/129, 160, 162, 187; 156/39, 346; 52/443; 106/772, 783
See application file for complete search history.

(56) References Cited

U.S. PATENT DOCUMENTS

| | | |
|---|---|---|
| 1,746,294 A | 2/1930 | Tyler |
| 1,798,857 A | 3/1931 | Tyler |
| 2,715,282 A | 8/1955 | Niven, Jr. |
| 2,934,328 A | 4/1960 | Zvejnieks |
| 2,934,830 A | 5/1960 | Zvenjnieks |
| 3,236,509 A | 2/1966 | Blair |
| 4,117,091 A | 9/1978 | Kongpricha et al. |
| 4,238,238 A | 12/1980 | Kinkade et al. |
| 4,247,518 A | 1/1981 | Charlet et al. |
| 4,432,954 A | 2/1984 | Quante |
| 4,455,285 A | 6/1984 | Watkins et al. |
| 4,744,963 A | 5/1988 | Dozsa et al. |
| 4,820,053 A | 4/1989 | Rivers et al. |
| 4,842,842 A | 6/1989 | Kudo |
| 4,890,394 A | 1/1990 | Troetscher et al. |
| 5,011,668 A | 4/1991 | Ball et al. |
| 5,013,237 A | 5/1991 | Bergounhon |
| 5,139,749 A | 8/1992 | White |
| 5,248,387 A | 9/1993 | Hansen |
| 5,437,850 A | 8/1995 | Kroehl et al. |
| 5,520,779 A | 5/1996 | Bold |
| 5,659,975 A | 8/1997 | Bahner et al. |

(Continued)

FOREIGN PATENT DOCUMENTS

| | | |
|---|---|---|
| CN | 2354956 | 12/1999 |
| GB | 2213810 | 8/1989 |

*Primary Examiner* — Timothy Vanoy
(74) *Attorney, Agent, or Firm* — GrayRobinson, P.A.; Michael J. Colitz, III

(57) ABSTRACT

The present invention relates to a system and associated method for the production of gypsum in manufacturing plant. More specifically, the invention relates to the production of alpha-type gypsum in a gypsum board manufacturing plant. The system yields increased efficiencies by capturing heat given off during processing steps and using that heat to reduce the energy needed for calcination. The invention finds particular application in the production alpha-type gypsum. The present invention is described in greater detail hereinafter in conjunction with the following specific embodiments.

18 Claims, 3 Drawing Sheets

U.S. PATENT DOCUMENTS

| | | |
|---|---|---|
| 5,743,954 A | 4/1998 | Rowland et al. |
| 5,798,087 A | 8/1998 | Suda et al. |
| 6,054,101 A | 4/2000 | Langfeldt et al. |
| 6,251,979 B1 | 6/2001 | Luongo et al. |
| 6,438,939 B1 | 8/2002 | Uematsu et al. |
| 7,498,014 B2 * | 3/2009 | College .................. 423/555 |
| 7,955,587 B2 * | 6/2011 | College .................. 423/555 |
| 2001/0001218 A1 | 5/2001 | Luongo |
| 2004/0011038 A1 | 1/2004 | Stinger et al. |
| 2005/0188898 A1 | 9/2005 | Bruce et al. |
| 2007/0172413 A1 | 7/2007 | College |
| 2011/0300032 A1 * | 12/2011 | College .................. 422/291 |

\* cited by examiner

SYSTEM AND METHOD FOR THE PRODUCTION OF GYPSUM USING HEAT RECOVERY

RELATED APPLICATION DATA

This is a continuation of and claims priority to application Ser. No. 12/395,724 filed on Mar. 2, 2009 (now U.S. Pat. No. 7,955,587) and entitled "Process for Production of Alpha Plaster at Board Plants Using Heat Recovery from the Board Plant Stack." The '724 application is a continuation of and claims priority to Ser. No. 11/653,073 filed on Jan. 12, 2007 (now U.S. Pat. No. 7,498,014) and entitled "Process for Production of Alpha Plaster at Board Plants Using Heat Recovery from the Board Plant Stack." The '073 application, in turn, claims priority to Provisional Application Ser. No. 60/758,790 filed on Jan. 13, 2006 and entitled "Process for Production of Alpha Plaster at Board Plants Using Heat Recovery from the Board Plant Stack." The contents of all these applications are fully incorporated herein for all purposes.

BACKGROUND OF THE INVENTION

1. Field of the Invention

This invention relates to a system and method for the production of gypsum in a plant. More particularly, the present invention relates to recovering heat at various locations within a board manufacturing plant and using the recovered heat to reduce the energy needed for subsequent calcination.

2. Description of the Background Art

It is known in the art to calcine gypsum in the manufacture of plasters, stuccos, gypsum wallboards and other building materials. However, the plants that produce gypsum-based building materials tend to be extremely inefficient users of energy as large amounts of energy are needed to adequately dry gypsum. For instance, some processes require 60 lbs. of water to be evaporated for every 100 lbs of gypsum produced. The background art contains numerous examples of attempts to increase the efficiency of gypsum manufacturing methods.

Some of these systems recover the heat from calcination and use it for further calcination. For example, U.S. Pat. No. 2,934,830 to Zvejnieks discloses a method whereby hot water vapors obtained by calcinating gypsum are used to further calcinate and dry the gypsum. To achieve this, the apparatus includes a drying shaft that transports dried gypsum upwardly for removal at an upper outlet. Hot water vapors from a calcination apparatus are directed and delivered downwardly through the shaft as the gypsum is concurrently delivered upwardly. The hot water vapors are used to both heat and dry the gypsum within the shaft.

Furthermore, U.S. Pat. No. 1,798,857 to Tyler discloses a method for the continuous calcination of gypsum. The method employs steam obtained from gypsum that is calcined in kettles to heat a steam jacket and chamber. The steam provided to jacket serves to calcinate gypsum within chamber. Additional hot gases collected within a separator can also be reused.

Lastly, U.S. Pat. No. 1,746,294 to Tyler discloses a method for the continuous calcination of gypsum. The method employs a separating chamber that includes a steam dome and a condenser, whereby excess steam can be collected, condensed and stored for subsequent use. The apparatus further includes a pre-heater wherein gypsum is partially calcined. Heated steam from the partial calcination is collected and used for further calcination within an additional calcinating chamber.

Although the above referenced inventions achieve their respective objectives, none address the inefficiencies unique to the manufacture of alpha-type gypsum, nor do they address the inefficiencies inherent in the manufacture of gypsum based building materials, such as gypsum board. The present invention is directed to overcoming these inefficiencies.

SUMMARY OF THE INVENTION

It is therefore one of the objects of the present invention to manufacture alpha-type gypsum in an energy efficient manner.

Another objective of the present invention is to remedy the inefficiencies inherent in the production of gypsum-based building materials.

It is also an object of this invention to provide a process for the production of gypsum building materials wherein heat generated from the drying of gypsum-based building materials is recovered and used for calcination.

Still another object of this invention is to provide a process wherein heat can be recovered at multiple locations throughout a building material plant and used in calcination.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

The present invention relates to a system and associated method for the production of gypsum in a manufacturing plant. More specifically, the invention relates to the production of alpha-type gypsum in a gypsum board manufacturing plant. The system yields increased efficiencies by capturing heat given off during processing steps and using that heat to reduce the energy needed for calcination. The invention finds particular application in the production alpha-type gypsum. The present invention is described in greater detail hereinafter in conjunction with the following specific embodiments.

Figure 1:
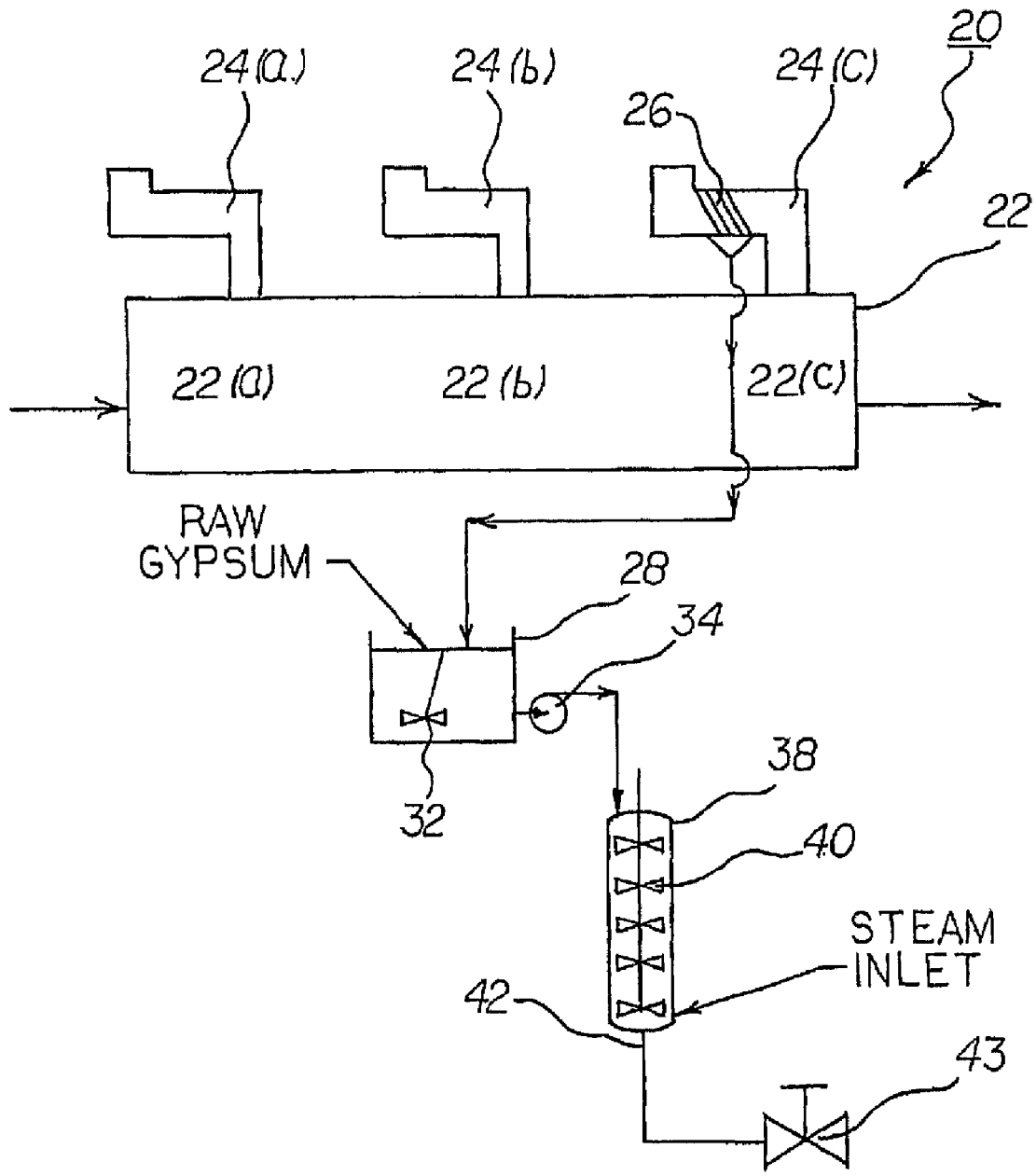
FIG. 1 is a schematic diagram of the primary embodiment of the gypsum production method of the present invention.

The primary embodiment of the present invention is described in conjunction with FIG. 1. FIG. 1 is a schematic illustrating the various components within a plant that is designed for the manufacture of gypsum-based building materials. Although the particular plant illustrated is utilized in the production of gypsum wallboard, the present invention can be carried out in connection with the manufacture of a variety of building materials.

Plant 20 includes a board dryer 22 for transporting and drying a series of gypsum boards. Dryer 22 includes vertically arranged dryer stacks 24 for use in evacuating gasses from inside the dryer 22. A condenser 26 is associated with one or more of these stacks and in used in capturing the latent and sensible heat of the steam leaving the stacks in a manner more fully described hereinafter. The system further includes a mixing vessel 28 and stirrer 32 that are used to collect and mix the components necessary to form a gypsum slurry. A Moino-type or positive displacement type pump 34 is utilized to deliver the slurry from mixing vessel 28 into an autoclave 38. Autoclave 38 is pressurized and includes a multiple mixer blade 40 and steam injector, whereby the slurry is heated under a pressure of 3-4 Bar and converted to an alpha hemihydrate and thereafter transported to an exit 42. A flow meter and pressure let down valve 43 control the exit flow. Once processed in autoclave 38, the alpha gypsum can be used in the formation of various building components, including gypsum board.

Figure 2:
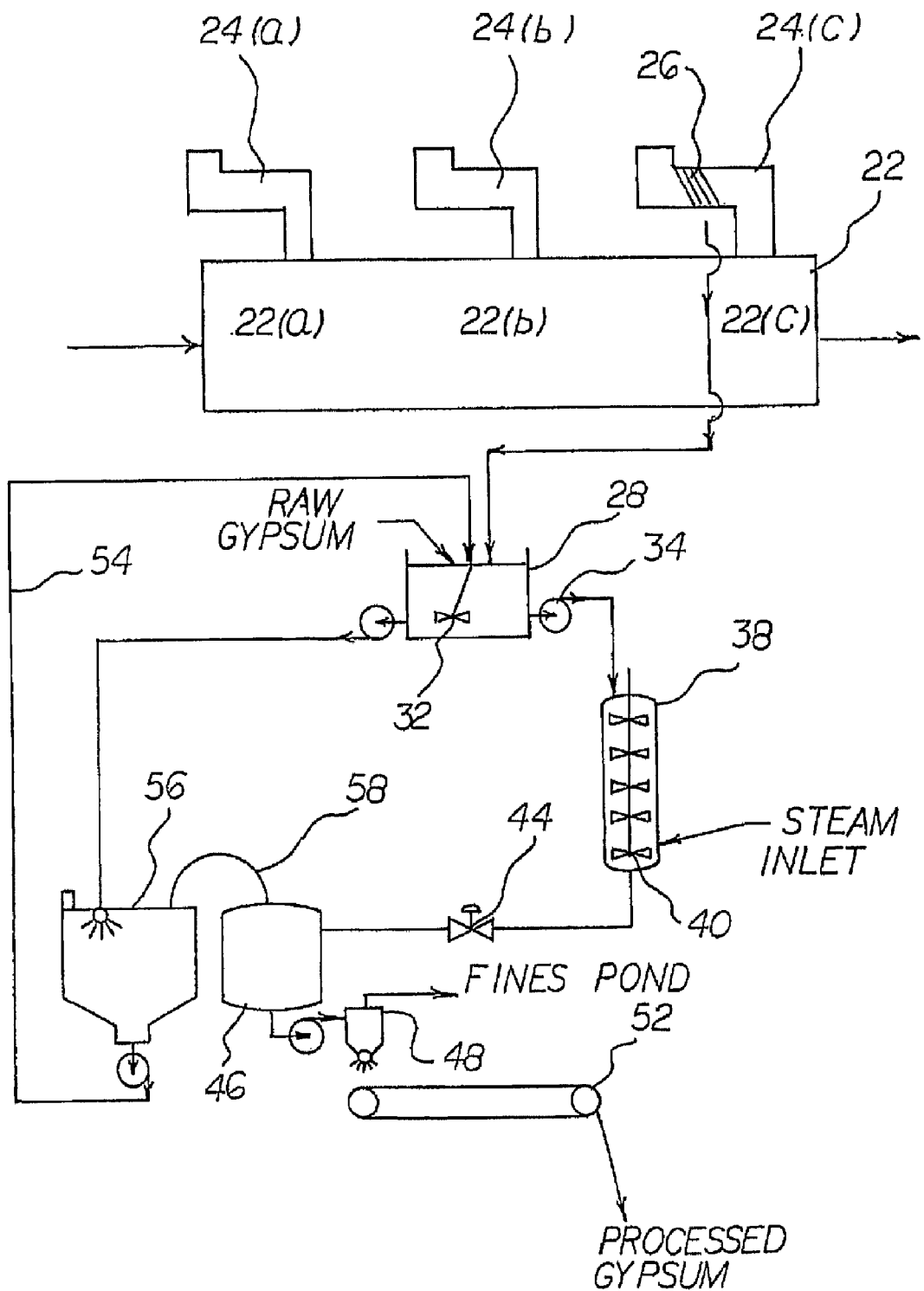
FIG. 2 is a schematic diagram of an alternative embodiment of the gypsum production method of the present invention.
Figure 3:
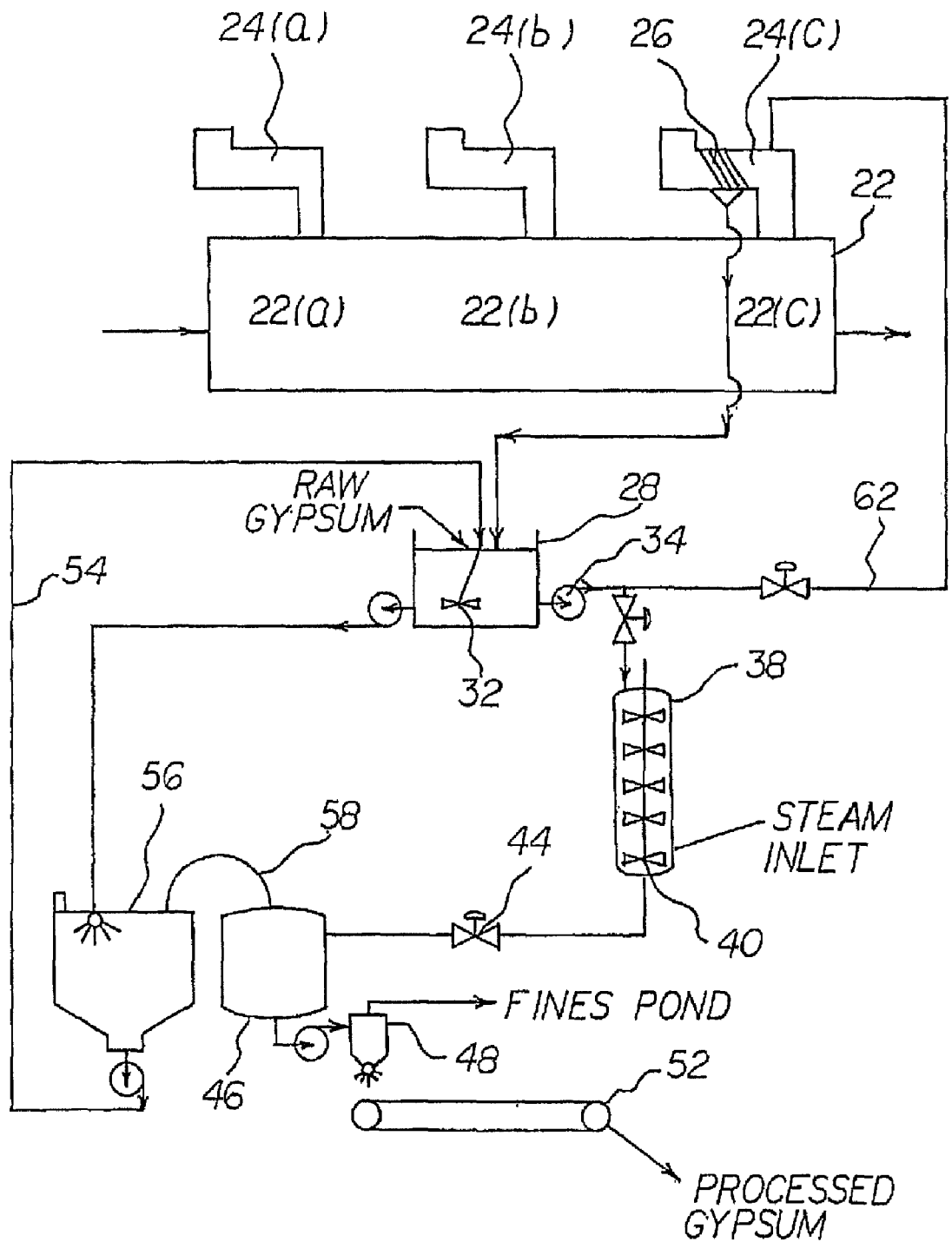
FIG. 3 is a schematic diagram of an alternative embodiment of the gypsum production method of the present invention.

The alternative embodiments of FIGS. 2 and 3 illustrate further aspects of the system. These alternative embodiments generally include a valve 44 for controlling the flow of the processed gypsum into a flash tank 46 wherein the gypsum is cooled and excess steam is collected. The excess steam is then routed to a condensate scrubber 56 via steam conduit 58. Steam within scrubber 56 is then condensed and the condensate is returned to vessel 28. Gypsum from flash tank 46 is then routed to a hydroclone separator 48 where unwanted particulates are removed. Additional filtration can be carried via a belt filter 52. The operation of the system, in both its primary and alternative embodiments, is described in more detail hereinafter.

With reference to FIG. 1, the construction of board dryer 22 is well known to those skilled in the art of manufacturing gypsum board. Typical dryer construction includes one or more conveyer belts for transporting boards from an inlet to an outlet. The inlet can be associated with one or more additional conveyors for use in carrying out additional manufacturing steps. For example, the boards may be cut to a desired size or shape and thereafter transported to the inlet of dryer 22. Likewise, additional conveyors can be associated with the outlet of dryer 22 for downstream processing of the boards. This additional downstream processing may include, for example, board coating and/or packaging steps.

Heating within dryer 22 can be accomplished via direct injection from gas burners. The heat from these burners can be diluted with recirculated gas so that the temperature within the dryer will be within the approximate range of 240° F. to 380° F., depending upon the zone. The internal temperature of dryer 22 can be maintained by insulating dryer 22 using known techniques. Dryer 22 preferably includes a series of stages that allow for the progressive drying of the boards. The embodiment depicted in FIG. 1 includes three such stages 22(a), 22(b), 22(d). Each of the dryer stages includes a corresponding chimney or stack 24(a), 24(b) and 24(c). The stages may likewise include separate heaters (not shown).

By way of this successive heating, the boards passing through dryer stages 22(a), 22(b) and 22(c) are heated to a degree sufficient to evaporate any excess moisture within the boards. Stacks 24(a), 24(b) and 24(c) permit this excess moisture to be removed from dryer 22 as steam. In a multi-zone dryer, such as the one depicted, most of the moisture will be removed in the final zone 22(c), and most of the steam will exit dryer 22 through the final stack 22(c). Once the boards exit dryer 22 they are cooled and transported for additional processing.

Steam leaving stacks 24(a), 24(b) and 24(c) will have a temperature of anywhere between 240° F. and 380° F., and more often this steam will be within the range of 300° F. and 380° F. In accordance with the present invention, both the latent and sensible heat from the steam is captured via a condenser 26 and used to calcinate raw gypsum into an alpha-type gypsum. Although a condenser can be associated with each of the stacks (24(a), 24(b), and 24(c)) of dryer 22, the preferred embodiment utilizes just a single condenser that is operatively connected to primary stack 24(c). This design is a reflection of the fact that most of the vapor, and thereby most of the heat, will escape from dryer 22 via the primary stack 24(c).

Condenser 26 can employ any of a number of different and widely known constructions and can be, for example, either an air cooled or liquid cooled condenser. The construction includes a heat exchanger (for use with an air cooled condenser) or coils (for use with a liquid cooled condenser), either of which are thermodynamically coupled to stack 24. With a liquid cooled condenser, a cooling medium, such as water or any of a number of commonly known refrigerants, is circulated through the coils via a pump (not shown). By bringing the cooling medium into thermodynamic contact with the steam, the overall temperature of the exiting steam is reduced. By reducing the temperature of the steam at least a portion of the steam is converted from the vapor phase to the liquid phase. This liquid phase is a hot condensate with a temperature within the approximate range of 180° F. to 200° F., although the temperature of the condensate can be as high as 210° F. In one specific example, the condensate is about 200-210° F. with a heat capacity of 1 BTU/lb/° F. These temperatures are provided only as an example, as the exact temperature of the condensate will depend upon a number of factors, such as the temperature and quantity of steam leaving the stack, the construction of the condenser and the type of working fluid utilized. Condensate from condenser 26 is then collected and routed via pipes to mixing vessel 28.

With continuing reference to FIG. 1, mixing vessel 28 is a collection point for raw gypsum, moisture and condensate from condenser 26. A stirrer 32 is included in order to sufficiently blend these components within the vessel 28. In the preferred embodiment, there is a 50:50 ratio by weight between the moisturized gypsum, on the one hand, and the condensate on the other. It has been found that this weight ratio produces a slurry with a consistency that is beneficial for further processing. Additionally, as a result of the increased temperature of the condensate that is added to tank 28 (e.g. between 180° F. to 210° F.), the resulting slurry mixture has a temperature within the approximate range of 140° F. to 185° F. In one example, if the gypsum temperature is about 70° F. with a heat capacity of 0.25 BTU/lb/° F., and assuming an Adiabatic system, condensate having a temperature of 200-210° F. with a heat capacity of 1 BTU/lb/° F. will produce a slurry temperature of about 182° F. The slurry should be about 20-50% solids. Again, however, these temperature ranges are provided as a representative example as the exact ranges will depend upon a variety of factors. The heated slurry is then transported to autoclave 38 for further processing.

Autoclave 38 can be any of a number of standard autoclave designs that are commonly used in wet or slurry type calcination. Autoclave 38 is a sealed vessel that includes stirrers 40 and a steam inlet. The internal pressure and temperature of autoclave 38 are increased via steam sparging. By heating raw gypsum within autoclave 38, typically to a temperature of about 280° F., calcination is carried out in accordance with the following equation: $CaSo_4.2H_2O + heat = (CaSo_4 \cdot \frac{1}{2}H_2O) + 1.5H_2O$. Thus, as is well known in the art of gypsum processing, calcination converts calcium sulfate dihydrate into a calcium sulfate hemi-hydrate. Furthermore, carrying out the calcination under pressure yields an alpha-type calcium sulfate hemi-hydrate. Alpha-type plaster has a high mechanical strength with a compact crystal structure and low water demands. Thus, use of alpha-type plaster is sometimes preferred for building materials because it yields hard, low porosity casts.

By first heating the slurry in mixing tank 28, autoclave 38 only needs to raise the slurry temperature from the starting temperature of 140° F. to 160° F. to the calcinating temperature of 240° F. By contrast, using an unheated slurry would require heating the slurry within autoclave 38 from a starting temperature of approximately 60° F. to the calcinating temperature of 240° F. This is the energy savings realized by recapturing the latent and sensible heat from dryer 22. The processed alpha-type gypsum is then removed from autoclave 38, via exit 42 and valve 43, for further processing, such as with a hydroclone separator 48 or belt filter 52 (note FIGS. 2 and 3). Thereafter, the processed gypsum can be incorporated into the gypsum based building materials, such as wallboards, using known techniques.

In still yet further embodiments of the present invention, described in conjunction with FIGS. 2 and 3, additional heat recovery is utilized to further increase the temperature of the slurry delivered to autoclave 38. This additional heat recovery generates an even greater energy savings during calcination. In the embodiment of FIG. 2, the processed gypsum from autoclave 38 is delivered, via pressure let down valve 44, to a flash tank 46. Flash tank 46 permits the alpha gypsum slurry to cool and depressurize. Steam generated by the gypsum within flash tank 46 is collected and routed to condensate scrubber 56 via conduit 58. The collected steam within scrubber 56 is then condensed via slurry from mixing tank 28. More specifically, slurry from tank 28 is routed to scrubber 56 via a sprayer where it is used as a working fluid to further cool the captured steam and bring it into the liquid phase as a condensate. The result is a hot condensate that is delivered back to mixing vessel 28 via conduit 54. The additional heated condensate from scrubber 56 serves to increase the temperature of the slurry even further to an approximate range of 170° F. to 190° F. Again, increasing the temperature of the slurry in this fashion yields substantial energy savings during subsequent calcination within autoclave 38. The alpha gypsum slurry within tank 46 is then removed via a pump for further processing by the hydroclone separator 48 and belt filter 52. All other components are the same as the primary embodiment of FIG. 1.

It has been found that the energy required for taking the gypsum slurry from its normal temperature of 60° F. to the starting point of 180° F. represents two-thirds of the energy required to take the slurry from 60° F. to 240° F. As a result, a substantial energy savings is realized by this additional heat recovery.

A still further energy savings is realized by even additional heat recovery. The alternative embodiment of FIG. 3 illustrates a system wherein a portion of the gypsum slurry within tank 28 is routed to condenser 26 via a valve and conduit 62. This portion of the gypsum slurry is then utilized as the cooling medium in condenser 26, whereby the slurry is used to cool the steam leaving stack 24(c). The remaining slurry is removed from tank 28 via a valve for delivery to autoclave 38 for processing as described above. All other components are the same as the alternative embodiment of FIG. 2. This embodiment results in an even greater energy savings as the slurry is used to bring the vapor into the liquid phase. This embodiment also eliminates the need for an independent cooling medium.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,
What is claimed is:

1. A system for the energy efficient production building board from raw gypsum, the system comprising:
   a board dryer for drying the building board and evaporating excess moisture;
   a stack associated with the board dryer, the stack adapted to remove the evaporated excess moisture as steam;
   a condenser in thermodynamic contact with the stack, the condenser condensing the steam and converting it into hot condensate;
   a mixer for mixing the hot condensate with the raw gypsum to produce a gypsum slurry having a temperature of between approximately 140° F. to 185° F.;
   an autoclave for calcinating the heated gypsum slurry wherein temperatures necessary for calcinating are more efficiently achieved via the hot condensate.

2. A system for the energy efficient production building board comprising:
   a board dryer for drying the building board and evaporating excess moisture;
   a stack associated with the board dryer, the stack adapted to remove the evaporated excess moisture as steam;
   a condenser in thermodynamic contact with the stack, the condenser condensing the steam and converting it into hot condensate;
   a mixer for mixing the hot condensate with gypsum to produce a heated gypsum slurry;
   a vessel for calcinating the heated gypsum slurry wherein temperatures necessary for calcinating are more efficiently achieved via the hot condensate.

3. The system as described in claim 2 wherein the heated gypsum slurry has a temperature in the range of approximately 140° F. to 185° F.

4. The system as described in claim 2 wherein the gypsum slurry has a solids content of between approximately 20 to 50%.

5. The system as described in claim 2 further comprising an autoclave for calcinating the heated gypsum slurry.

6. The system as described in claim 5 wherein the autoclave produces alpha type gypsum.

7. The system as described in claim 2 wherein the hot condensate has a temperature in the range of approximately 200 to 210° F.

8. The system as described in claim 2 wherein the hot condensate has a heat capacity of approximately 1 BTU/lb/° F.

9. The system as described in claim 2 wherein a plurality of stacks are provided and wherein a condenser is associated with each of the stacks.

10. A system for the energy efficient calcination of gypsum, the system being carried out in a building board plant, the system comprising:
- a stack for evacuating steam from the building board plant;
- a heat exchanger in thermodynamic communication with the stack, the heat exchanger converting the evacuated steam into hot condensate;
- a mixer for mixing the hot condensate with raw gypsum to produce a heated slurry;
- a vessel for calcinating the heated slurry.

11. The system as described in claim 10 wherein the vessel produces alpha type gypsum.

12. The system as described in claim 10 wherein the heated slurry has a temperature in the range of approximately 140° F. to 185° F.

13. The system as described in claim 10 wherein the heated slurry has a solids content of between approximately 20 to 50%.

14. The system as described in claim 10 wherein the heat exchanger is a condenser.

15. The system as described in claim 10 wherein the vessel is an autoclave.

16. The system as described in claim 10 wherein the condensate has a temperature of between approximately 200 to 210° F.

17. The system as described in claim 10 wherein the condensate is first collected prior to being delivered to the mixer.

18. The system as described in claim 10 wherein the calcination is carried out in accordance with the following equation: $CaSo_4 \cdot 2H_2O + heat = (CaSo_4 \cdot \frac{1}{2}H_2O) + 1.5H_2O$.

* * * * *

UNITED STATES PATENT AND TRADEMARK OFFICE
CERTIFICATE OF CORRECTION

PATENT NO. : 8,388,926 B2
APPLICATION NO. : 13/153981
DATED : March 5, 2013
INVENTOR(S) : John W. College It is certified that error appears in the above-identified patent and that said Letters Patent is hereby corrected as shown below:

In the Specification

Col. 3, line 3, the text "within a plant that is" should be "within a plant 20 that is".

Signed and Sealed this
Twenty-fourth Day of September, 2013

Teresa Stanek Rea
*Deputy Director of the United States Patent and Trademark Office*